United States Patent Office 3,255,137
Patented June 7, 1966

3,255,137
POLYALPHA OLEFIN POLISH COMPOSITION
Russell G. Hay, Gibsonia, Stanley M. Hazen, Cheswick, and Charles M. Selwitz, Pitcairn, Pa., assignors to Gulf Research & Development Company, Pittsburgh, Pa., a corporation of Delaware
No Drawing. Filed May 28, 1962, Ser. No. 197,880
11 Claims (Cl. 260—28.5)

This invention relates to coating compositions and, in particular, to a coating composition capable of forming a film comparable to a film of carnauba wax.

Carnauba wax has long been valued for its hardness and the high durable gloss it imparts to surfaces on which it is coated. Carnauba wax is a natural wax, however, and, due to the limited supply, has always been comparatively expensive.

It has now been discovered that coating compositions can be prepared capable of forming films comparable to a film of carnauba wax from selected polymers of specific linear alpha-olefins.

In accordance with the invention, it has been found that compositions comprising a linear alpha-olefin polymer having a weight average molecular weight of at least 100,000, substantially each alternate carbon atom in the linear polymer chain having dependent therefrom an alkyl radical having between 14 and 48 carbon atoms, and an inert volatile carrier are excellent coating compositions. These coating compositions when applied to base surfaces, deposit a film which is comparable to a film of carnauba wax.

The selected polymers which are utilized to form the compositions of this invention have the general formula:

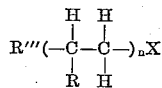

where R is an alkyl radical having 14 to 48 carbon atoms; R''' is the same as R''' defined hereinafter for the organo-aluminum catalyst component; n is a large integer such that, when taken in conjunction with the average chain length of the alkyl radical, the weight average molecular weight of the olefin polymer is at least 100,000; and x is selected from the group consisting of hydrogen;

where R is as defined above; and possibly trace amounts of a metal selected from the group consisting of the metal polymerization catalyst components as defined hereinafter. When R in the above formula is an alkyl radical having 48 carbon atoms, for example, and the polymer has a molecular weight of 100,000, n would have a value of about 143. The value for n can, therefore, vary between about 140 and about 72,000 or higher, with preferred values depending upon the preferred olefin charge stock and the preferred molecular weight of the polymers.

The selected polymers which are utilized to form the compositions of this invention have a weight average molecular weight of at least about 100,000. The weight average molecular weight is defined, for example, on page 292 of "Principles of Polymer Chemistry," by P. J. Flory, Cornell University Press, 1953. The preferred weight average molecular weight of the selected polymers is between 500,000 and 15,000,000, with more preferred molecular weights between 1,000,000 and 6,000,000. The molecular weights of the selected polymers of this invention were determined by the method of dilute solution viscosity which was correlated with the weight average molecular weight of polymers obtained by the light scattering technique which is described, for example, in the article entitled, "Photoelectric Light—Scattering Photometer for Determining High Molecular Weights," by Brice, B. A.; Holwer, M.; and Speiser, R., in "Journal of the Optical Society of America," 1950, volume 40, page 768. The correlation of weight average molecular weight and dilute solution viscosity was found to be represented by the following formula:

Weight average molecular weight $= 4.6 \times 10^5 \times V^{1.98}$ where V is the viscosity of a two weight percent solution of the polymer in heptane at 100° F. Some dilute solution viscosities were obtained at temperatures of 175° and 210° F. and related back to viscosities at 100° F. by known methods.

The selected polymers of this invention are also characterized by their hardness. Thus, the selected polymers of this invention have needle penetration values by the ASTM test D–1321 of less than five, and preferably about one or less. In addition, the melting points of the selected polymers of this invention are between 50° and 100° C. with the preferred polymers having melting points greater than 70° C. In addition, the specific gravity of the selected polymers of this invention is between 0.840 and 0.940 at 27° C. with the preferred polymers having specific gravities between 0.850 and 0.900 at 27° C.

The selected polymers utilized in the present invention can be prepared by any suitable process. One satisfactory polymerization process comprises the polymerization of alpha-olefins having from 16 to 50 carbon atoms per molecule by means of a catalyst complex comprising an organo-aluminum compound and a heavy metal compound. The organo-aluminum compound contains at least one hydrocarbon radical linked through a carbon atom directly to the aluminum. Organo-aluminum compounds that can be employed can be represented by the structural formula:

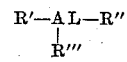

wherein R' is a hydrocarbon radical such as an alkyl, aralkyl, aryl, alkaryl, or cycloalkyl radical, examples of such radicals being ethyl, propyl, isobutyl, amyl, hexyl, dodecyl, phenylethyl, benzyl, phenyl, tertiarybutylphenyl, and cyclohexyl radicals; R'' is also a hydrocarbon radical as above defined, an OR' radical, hydrogen, or halogen such as chlorine, bromine, iodine, and fluorine; and R''' is hydrogen or a hydrocarbon radical as defined above.

Examples of such organo-aluminum compounds are triisobutylaluminum, diisobutylaluminum hydride; dipropylaluminum chloride; phenylaluminum dihydride; dioctylaluminum bromide; cyclohexyl-bromo-aluminum hydride; ditertiarybutylphenylaluminum hydride; n-pentylisobutylaluminum chloride; dioctylaluminum hydride; and dipropylcyclohexyl aluminum.

The heavy metal compound constituting a component of the catalyst is a compound of a metal occupying the fourth to the sixth positions of the long periods of the periodic table in which the elements are arranged in short and long periods and the alkali metals occupy the first position (see periodic chart of the elements on pages 448 and 449 of the 43rd edition of "Handbook of Chemistry and Physics, 1961–1962," published by Chemical Rubber Publishing Company). These metals are titanium, zirconium, hafnium, vanadium, niobium (columbium), tantalum, chromium, molybdenum, tungsten and metals in the corresponding positions in the last long period in the so-called "actinium series," that is, thorium, protactinium and uranium. The preferred heavy metal compounds are the salts of the heavy metal with monovalent anions. Especially preferred are the halides (chlorides, bromides, iodides and fluorides) and acetyl acetonates of titanium, zirconium and thorium. Titanium halides, especially titanium chlorides, and more especially titanium trichloride, constitute preferred heavy metal compounds. Other heavy metal compounds include other inorganic salts of the metals such as oxyhalides, sulfates, nitrates and sulfides and other organic salts such as acetates and oxalates of the heavy metals.

The molar ratio of the organo-aluminum compound to the heavy metal compound may be varied over a wide range. In general, larger ratios of the organo-aluminum compound to the heavy metal compound are employed when the heavy metal compound is present in the higher valence state. The molar ratio of the organo-aluminum compound to the heavy metal compound can vary between about 0.1:1 and 10:1 with preferred ratios between about 0.4:1 and 3:1.

The alpha-olefins which can be employed to produce the polymers for use in the coating compositions of this invention comprise those alpha-olefins which have between 16 and 50 carbon atoms or more per molecule. The preferred alpha-olefins are those having between 18 and 30 carbon atoms per molecule and still more preferred are the substantially straight chain alpha-olefins having between 18 and 30 carbon atoms per molecule. Mixtures of alpha-olefins can also suitably be employed. In addition, in the event small amounts of internal olefins are present in the charge, a portion of these may enter into the polymerization reaction. Suitable olefins or mixtures of olefins may be obtained, for example, from wax-cracking, polymerization or the more recent telomerization process, such as that described in "Annalen die Chemie" 629, 1–256 (1960). Examples of suitable olefins include octadecene-1, eicosene-1, tetracosene-1, hexadecene-1, docosene-1, hexacosene-1, octacosene-1, triacontene-1, nonadecene-1, heneicosene-1, hentriacontene-1, pentatriacontene-1, 7-methyloctatriacontene-1, 6-t-butyl-heptacosene-1, 7-cyclohexyldocosene-1, 14-cyclododecyl-tetracontene-1, 6,9,15-trimethyltetracosene-1, 7-phenyl-eicosene-1, 17-cyclopropylpentatriacontene-1, 9-(3-isobutylcyclohexyl) - pentadecene - 1, 6 - methyl - 8 - ethyl - 10 - n - propyl - 12 - isopropyl - 14 - n - butyl - 16 - t-butyl - triacontene - 1, 6 - methyl - 8 n - propyl - 10-ethyl-12-isopropyl-14-n-butyl-16-t-butyl-triacontene-1.

The catalyst comprising the organo-aluminum compound and the heavy metal compound should be amployed in a concentration such that the organo-aluminum compound is present in a concentration of at least 0.1 millimole per liter of alpha-olefin. The preferred concentration of the organo-aluminum compound is between about 1.5 to 100 millimoles per liter of alpha-olefin.

Although a reaction solvent is not necessary, it is preferred that a reaction solvent be employed. A reaction solvent may be any non-polymerizing inert liquid. Examples of suitable inert reaction solvents include saturated hydrocarbons, such as heptane or cyclohexane, as well as liquid aromatic hydrocarbons, such as benzene. The reaction solvent should preferably have from about 4 to 10 carbon atoms per molecule and should be used in an amount from about 1.0 to about 50 volumes for each volume of the olefin monomer.

Any polymerization pressure can be employed. Thus, pressures from atmospheric or below to 1000 p.s.i.g. or higher can be employed. Atmospheric pressure is, of course, preferred. Any polymerization temperature can be employed so long as the reactants are maintained in the liquid phase and neither the catalyst, solvent or olefin are thermally decomposed. Thus, the lower limit for the reaction temperature is determined by the freezing point of the reactants while the upper temperature is limited by the vaporization temperature of the reactants under the reaction pressure employed or the thermal decomposition point of the catalyst or reactants. In general, reaction temperatures between −40° and 120° C. are preferred with still more preferred temperatures being between 25° and 80° C.

The reaction time should be sufficient to yield a satisfactory conversion of olefin to polymer. The reaction time can be between 0.1 and 24 hours with preferred reaction times between 1 and 10 hours.

The reaction product from the polymerization process comprises polymer, catalyst, and reaction solvent, if employed. The polymer in this environment is unsuitable for use as a coating composition due to the presence of the polymerization catalyst, at least a portion of which is still active. If the catalyst is permitted to remain in the reaction product, the product is black in color and degradation of the polymer may occur on eposure of the reaction product to the atmosphere. The catalyst must therefore be inactivated. The inactivation or "killing" of the catalyst is generally achieved by the addition of an active hydrogen compound, e.g., an alcohol such as, for example, isopropanol or water to the reaction product. The addition of the alcohol or water also serves to quench the reaction product, dissolve catalyst, and coagulate the polymer into a solid. The polymer is thereafter separated by any suitable means, such as centrifugation, from the alcohol and reaction solvent, if any, and further treated to remove residual amounts of catalyst. For example, the polymer can be further washed or treated with dilute hydrochloric acid to convert the catalyst into soluble chlorides. If the acid treatment is used, the polymer would then be neutralized with dilute caustic and washed with further amounts of an alcohol, such as isopropanol.

The selected polymers defined above which are to be utilized in the compositions of this invention are not suitable as coating compositions per se, due to their characteristics of hardness and high melting point, which makes spreading the polymers over the base surfaces to be coated so difficult as to be unfeasible. It is therefore necessary that the selected polymers defined above be blended with a carrier. The function of the carrier is to aid in dispersing the selected polymers over the surface to be coated. It is also necessary that the carrier be a volatile carrier in order that the coating composition be capable of forming a film comparable to a film of carnauba wax; that is, the properties of the carrier must be such that the carrier will, after the coating composition is applied to the surface to be coated, substantially all vaporize under atmospheric conditions in a reasonable length of time of less than about two hours. It is also necessary that the volatile carrier be inert. A volatile carrier is inert when it does not substantially react with the polymers or the base surfaces to be coated.

The volatile carrier utilized in the coating compositions of this invention comprises any inert material, organic or inorganic, which boils at a temperature between about 80° and about 500° F. and preferably at a temperature between 200° and 475° F. at atmospheric pressure, and which forms and remains a stable blend with the selected polymers defined above. By a stable blend is meant a macroscopically substantially homogeneous mixture of the components of the blend. The stable blend can be either a solution, a gel, or an emulsion of the selected polymers and the volatile carrier.

One preferred type of carrier is an inert volatile organic material which boils at a temperature between about 80° F. and 500° F. at atmospheric pressure and which is substantially soluble with the selected polymers defined above. Since the selected polymers defined above have thickening or gelling properties, liquids of any desired viscosity or gels can be prepared by varying the ratio of the selected polymers to the inert volatile organic material. Suitable examples of inert volatile organic materials include hydrocarbon type materials which boil at a temperature between about 80° F. and 500° F. and preferably at a temperature between 200° F. and 475° F. at atmospheric pressure. Specific examples include straight run natural gasolines; Stoddard solvent; mixtures of aliphatic, alicyclic and aromatic hydrocarbons; pure hydrocarbons, such as those having between 3 and 14 carbon atoms per molecule, for example, saturated aliphatic hydrocarbons, such as pentane, isopentane, hexane, 2,2,5-trimethylhexane, and decane; unsaturated aliphatic hydrocarbons, such as pentene, 2,5-dimethylbutene-1, heptene-1, and octene-1; saturated alicyclic hydrocarbons, such as cyclohexane, and aromatic hydrocarbons, such as benzene and toluene.

When the selected polymers of this invention are not as soluble as desired in the inert volatile carrier, a surfactant is a necessary component of the volatile carrier so that a stable emulsion which is macroscopically homogeneous can be formed. Water is the primary example of a suitable volatile carrier in which the selected polymers of this invention are not as soluble as desired. Examples of other volatile carriers in which the selected polymers may not be as soluble as desired include oxygenated hydrocarbons, such as alcohols and ketones.

Mixtures of various inert volatile carriers may also be employed. When at least a portion of the inert volatile carrier is not as soluble as desired with other portions of the carrier or with the selected polymers of this invention, then a surfactant, as noted above, is a necessary component of the volatile carrier in order that the volatile carrier will form a stable blend with the selected polymers. A suitable mixture of inert volatile carriers is, for example, water, a surfactant, and a petroleum naphtha boiling between 300° F. and 400° F. at atmospheric pressure. The preferred inert volatile carrier will depend on the type of coating composition which is desired.

Any suitable surfactant can be employed. A surfactant can be defined broadly as a molecule containing both a hydrophobic group and a hydrophilic group. The surfactant lowers the interfacial tension between the volatile carrier and the polymers so that a dispersion of the polymer in the volatile carrier is obtained. By a "dispersion" is meant a colloidal suspension or emulsion, the dispersed particles of which possess an average diameter in the range of about ten millimicrons to one micron. The surfactant may be anionic, cationic, nonionic or amphoteric. Suitable anionic surfactants include, for example, carboxylic acid salts such as, for example, sodium stearate, potassium laurate, monoethanolamine palmitate, and triethanolamine stearate; and sulfuric acid ester salts such as, for example, sodium dodecylbenzene sulfonate; sodium lauryl sulfonate; and sodium lauryl sulfate. Suitable cationic surfactants include, for example, amide salts; quarternary ammonium salts; and the amino amides and imidazolines. Examples of cationic agents are 1-hydroxyethyl-2-heptadecenyl glyoxalidene hydrochloride; hexadecyl morpholinium ethoxy sulfate and octadecyl dimethyl benzyl ammonium chloride. Suitable nonionic surfactants include, for example, the alkyl and alkyl aryl ethers and thioethers; esters and amides. Examples of nonionic surfactants include polyethylene glycol tert-dodecylthioether; lauric, palmitic, stearic and oleic acid esters of sorbitol; sorbitol poly (ethylene oxide) lauric, palmitic, stearic, and oleic acid esters; and lauryl ethers of polyethylene oxide. A suitable example of an amphoteric surfactant is alpha-amino lauric acid. It is preferred that the surfactants be selected from the group consisting of the anionic and nonionic surfactants. The most preferred surfactants are the carboxylic acid salts and the nonionic esters. Mixtures of surfactants may also be employed.

The amount of surfactant to be employed must be sufficient to form a dispersion of the polymer in the volatile carrier. The exact amount of surfactant to be employed will, of course, be a function of the particular surfactant used, the particular polymer which is to be dispersed, and the amount of water in the final coating composition. In general, the amount of surfactant to be employed will vary from about 0.2 to 20 weight percent based on the final coating composition with preferred amounts of surfactant between 1 and 5 weight percent.

The selected polymer and volatile carrier can be blended together to form the coating compositions of this invention in any suitable manner. The polymers to be utilized in the compositions of this invention are, however, solid at normal temperatures, and it is therefore preferred to subject the polymers to sufficient heat to liquefy them before blending them with the volatile carrier. In general, the polymers will liquefy at temperatures between about 50° and 100° C. It is preferred to add the surfactant, if one is required, to the liquefied polymer. It is also preferred to add the volatile carrier to the liquefied polymer.

The proportion of alpha-olefin polymer blended with the volatile carrier can vary over a wide range depending on the desired properties, particularly the viscosity, of the final coating composition. Thus coating compositions ranging from aqueous or non-aqueous liquids, creams or paste-like solids can readily be formulated by those having the skill in this art. The amount of alpha-olefin polymer in the final coating composition can vary from about 1% to 50% by weight of the final coating composition. The specific proportion required will depend upon a number of factors, i.e., the specific alpha-olefin polymer employed, the exact nature of the volatile carrier, and the type of product, i.e., liquid, cream or paste-like solid, which is desired.

Further variations in the properties of the coating compositions of this invention can be obtained by the addition of a natural wax. The term "natural wax" is meant to include all waxes, including carnauba wax, which are not synthetically produced, such as the animal, insect, vegetable, fossil and mineral waxes. Specific examples of such waxes can be found in the book entitled, "Chemistry and Technology of Waxes," by A. H. Warth, published by the Reinhold Publishing Company in 1956 in New York, New York. The vegetable waxes, which may be hard or soft, are primarily mixtures of oxygenated materials, such as acids, alcohols and ketones. The mineral waxes, particularly petroleum wax, are primarily normal paraffins, branched-chain paraffins and naphthenes with long saturated side chains. The mineral waxes can also be either hard or soft. The hardness or softness of a natural wax depends primarily on its chemical structure, its molecular weight and the amount of entrained foreign material, such as oil. It is preferred to add the soft natural waxes to the compositions of this invention. Examples of suitable soft animal, insect and vegetable waxes include candellila, esparto, japan, beeswax, chinese insect wax, spermaceti, and wool fat. Examples of suitable soft mineral waxes include petroleum waxes with melting points between 26° and 66° C., montan, ceresine, and ozokerite. The amount of natural wax added should be such that the resulting coating composition has improved film-forming properties. The weight ratio of natural wax to the selected polymers can be as high as 40:1. If a natural wax is added, however, the preferred weight ratio of natural wax to the selected polymers is between 0.1:1 and 16:1.

An alpha-olefin polymer to be utilized in the compositions of this invention was prepared by the following procedure. To 500 cc. of cyclohexane, which had been dried over molecular sieves, was added 100 cc. of a mixture of alpha-olefins having predominantly between 20 and 28 carbon atoms per molecule. The characteristics of this mixture of alpha-olefins are given in Table I below. This mixture of alpha-olefins was the 385° F. at 5 mm. Hg to 554° F. at 1 mm. Hg boiling range cut of the product obtained by the telomerization of ethylene at 200° C. and 4000 p.s.i.g. in the presence of three weight percent of a catalyst comprising triethylaluminum for about 15 minutes.

*Table 1.—Characteristics of the alpha-olefin charge material*

| | |
|---|---|
| Specific Gravity | 0.865 |
| Boiling Range: | |
| Initial Boiling Point at 5 mm. Hg pressure, °F. | 388 |
| End Point at 1 mm. Hg pressure, °F. | 554 |
| Olefin-type Analysis by Infra Red Analysis: | |
| $RCH=CH_2$ (Alpha-olefin): percent | 75.7 |
| $RCH=CHR'$ (Trans) | 2.1 |
| $RCH=CHR'$ (Cis) | 8.4 |
| $R_2C=CH_2$ (Vinylidene) | 10.5 |
| $R_2C=CHR$ (Tri-branched) | 3.3 |

| Olefin Distribution: Weight percent | | Olefin Distribution: Weight percent | |
|---|---|---|---|
| $C_{20}$ | 16.2 | $C_{32}$ | 4.9 |
| $C_{22}$ | 24.2 | $C_{34}$ | 2.9 |
| $C_{24}$ | 18.2 | $C_{36}$ | 2.8 |
| $C_{26}$ | 13.7 | $C_{38}$ | 0.6 |
| $C_{28}$ | 10.5 | $C_{40}$ | 0.2 |
| $C_{30}$ | 7.3 | $C_{42}$ | 0.1 |

To the admixture of cyclohexane and alpha-olefins defined above was added 0.62 gram of $TiCl_3$ (6.70 millimoles per liter of monomer plus cyclohexane) and 0.27 cc. of triethylaluminum (3.32 millimoles per liter of monomer plus cyclohexane). The admixture was held at the autogenous pressure of the reaction and at a temperature of 60° C. for 24 hours with constant agitation to insure thorough mixing. The admixture was then quenched with about 100 cc. of isopropyl alcohol and then poured into an additional 500 cc. of isopropyl alcohol with constant stirring. As the product thickened, it was stirred in the alcohol to wash out the cyclohexane and catalyst. The liquid was decanted and the product was again washed with 500 cc. of isopropyl alcohol, followed by two 500 cc. washes with methyl alcohol. The product, a copolymer of olefins mostly in the 20 to 30 carbon atom range which was called polycosene, was drained and dried in a vacuum overnight. A white powder was obtained, a portion of which was cast into a solid disc. The properties of this polymer, a typical petroleum wax and natural carnauba wax are given in Table II below. The properties of the film formed from the coating compositions of this invention which consists essentially of the selected polymers and an inert volatile carrier are substantially the same as the properties of the selected polymers since the volatile carrier vaporizes substantially completely away from the surface on which the coating composition is deposited, and therefore has relatively no effect on the properties of the film. In a similar manner, the properties of a film formed from a coating composition consisting essentially of the selected polymers of this invention, a natural wax, and an inert volatile carrier, are substantially the same as the mixture of the selected polymers and the natural wax.

Gels are prepared from the carnauba wax and the polycosene by melting 25 grams of the wax or polymer in a crystallizing dish in an oven held at 100° C. and adding with vigorous stirring to the wax or polymer 75 grams of a petroleum naphtha preheated to 75° C. The dish containing the wax-naphtha mixture is gently stirred with a thermometer to prevent premature cooling on the sides of the container. The temperature at which general precipitation is evident is recorded as the "Precipitation Temperature." The thermometer is removed and the gel is permitted to remain undisturbed for a period of 16 hours or more. The depth of penetration obtained with the standard grease cone as described in ASTM test D-217 with no added weights in five seconds at 25° C. is recorded as the "Cone Penetration" in tenth mm. units.

The data in Table II show that the properties of polycosene compare favorably with the properties of carnauba wax. Carnauba wax is valued for its hardness, for due to its hardness, carnauba wax is able to form films of superior durability and luster. Both the polycosene and carnauba wax had a hardness value of 1.0 on ASTM test D-1321, which is the limit for this test. A value of 1.0, therefore, indicated the polycosene was harder than petroleum waxes which have values of about seven on this test. The cone penetration test, ASTM D-217, is another method for determining the hardness of materials. On this test, the polycosene gel had a value of 14.5 tenth mm. units, which indicates the depth of penetration of the test cone, compared to a value of between 125–175 for the carnauba wax gel. This test indicates that the gel made from polycosene is considerably harder than the gel made from carnauba wax.

The data in Table II also shows that the melting points of the polycosene and the carnauba wax are similar. In addition, the precipitation temperatures for the two materials are similar.

Table III below shows the formulation for three stable coating compositions which were prepared. The polymer employed was the polycosene prepared as described above.

*Table III*

| | Formulation | | |
|---|---|---|---|
| | A | B | C |
| Ingredient, Weight Percent: | | | |
| Polycosene | 5 | 4.3 | 25 |
| Naphtha [1] | 10 | 24.9 | 75 |
| Span 40 [2] | 0.5 | | |
| Tween 40 [3] | 0.5 | | |
| Stearic Acid | 0.1 | 2.8 | |
| Water | 83.8 | 64.1 | |
| Paraffin Wax (M.Pt., 135° F.) | | 2.1 | |
| Triethanolamine | | 1.7 | |

[1] Stoddard solvent.
[2] Sorbitan monopalmitate.
[3] Polyoxyethylene sorbitan monopalmitate.

In preparing formulations A and B, the surfactants, i.e., the Span 40, Tween 40, stearic acid and triethanol-

*Table II*

| Property | Carnauba Wax | Typical Petroleum Wax | Polycosene |
|---|---|---|---|
| Hardness (ASTM D-1321) | 1.0 | 7.0 | 1.0 |
| Melting Point: | | | |
| (a) Transition Point Technique [1] with heated stage microscope, °C | 80–82 | 50–54 | 74–81 |
| (b) ASTM D-127 (Drop Point), °C | 84.5 | 52–56 | 92.6 |
| Naphtha Gelling Properties [2]: | | | |
| Precipitation Temp., °F | 118–123 | [3] | 119 |
| Cone Penetration (ASTM D-217) | 125–175 | [3] | 14.5 |
| Molecular Weight | 700–2,000 | 300 | [4] 1.5 |

[1] Obtaining melting points by this technique is described in "Technique of Organic Chemistry," Volume VI, Micro and Semimicro Methods, page 162, N.D. Cheronis, Interscience Publishers, Inc., New York, N.Y., 1954.
[2] See description of gel preparation below.
[3] Does not form gel.
[4] Million.

amine, were first added to the melted polycosene held at 75° C. (formulation A) or to the melted polycosene and paraffin wax held at 90° C. (formulation B). The naphtha preheated to the temperature of the polycosene was then added, followed by the addition of the water at the same temperature. During the addition of the water, the mixture was stirred at high speed in a Waring Blendor.

Formulation C was prepared by the addition of the naphtha preheated to 75° C. to 75° C. to the melted polycosense held at 75° C. while the formulation was stirred by hand in a beaker. When the mixture was allowed to cool, it formed a macroscopically homogeneous gel.

Formulations A and B were emulsion cream polishes; A resembled a white cold cream, and B a creamy milk. Formulation C formed a white paste-wax on cooling. These formulations were applied to the surfaces of furniture and formed films which upon buffing attained a superior luster.

A polymer of tetracosene, a $C_{24}$ alpha-olefin, was also prepared. The $C_{24}$ alpho-olefin charge stock to the polymerization process was a distillation plateau heart-cut boiling from 198°–200° C. at 2 mm. pressure of the product obtained by the telemerization of ethylene at 200° C. and 4000 p.s.i.g. in the presence of three weight percent of a catalyst comprising triethylaluminum. This heart-cut material was shown by gas chromatography to contain olefins having 24 carbon atoms per molecule and to contain about 80% alpha-olefin, i.e., tetracosene-1.

The polymerization of the tetracosene-1 was made under substantially the same conditions described above for the polymerization of the mixture of alpha-olefins whose characteristics are shown in Table I above. The polytetracosene had a weight average molecular weight of 1.8 million. The polytetracosene had a melting point of 82.5° C. obtained by the transition point technique referred to above in Table II; a needle penetration value by ASTM test D–1321 of 1.0; a specific gravity of 0.897 and the naphtha gelling properties included a precipitation temperature of 106° F. and a cone penetration value by ASTM test D–127 of 22.3 tenth mm. units. The naptha gelling characteristics were obtained by the same procedure as described above.

A coating composition was prepared which was the same as formulation B described in Table III above except the polytetracosene was substituted for the polycosene. This coating composition also resembled a creamy milk. This formulation was applied to the surface of furniture in a thin film, which film after substantial vaporization of the volatile carrier, was buffed and attained a superior luster.

Suitable liquid polishes are prepared having the formulations given in Table IV below.

Table IV

|  | Formulation | | | |
|---|---|---|---|---|
|  | D | E | F | G |
| Components, Weight Percent: | | | | |
| Polymer: | | | | |
| Polycosene | 1 | 16 | 10 | 2 |
| Paraffin Wax (135° F., M.Pt.) | 15.6 | | | 3 |
| Beeswax | | 16 | | |
| Triethanolamine | 2.1 | 2 | | |
| Stearic Acid | 4.6 | 4 | | |
| Naphtha [1] | | | 27 | 95 |
| Atlas G–9446N [2] | | | 3.0 | |
| Tween 20 [3] | | | 2.0 | |
| Water | 77.0 | 35 | 85 | |

[1] Stoddard solvent.
[2] Polyoxyethylene sorbitol oleate.
[3] Polyoxyethylene sorbitan monolaurate.

Formulations D, E, and F are emulsion-type coating compositions while formulation G is a solvent-type coating composition.

Suitable anhydrous paste waxes are prepared having the formulations given in Table V below.

Table V

|  | Formulation | | |
|---|---|---|---|
|  | H | I | J |
| Ingredient, Weight Percent: | | | |
| Polymer: | | | |
| Polycosene | 6 | | |
| Poly-1-octadecene | | 3 | |
| Poly-1-tetracosene | | | 6 |
| Montan Wax | 8 | 15 | |
| Utahwax | 1 | | |
| Candelilla Wax | | 3 | 15 |
| Scale Wax | | 6 | |
| Ozocerite | | | 2 |
| Paraffin (M.Pt., 135° F.) | 13 | | 6 |
| Nigrosine | 3 | 3 | |
| Turpentine | 69 | 70 | |
| Naphtha | | | 60 |
| Kerosene | | | 10 |

In the formulations shown in Table V, varying amounts of natural wax are added, with formulation I having a weight ratio of natural wax to polymer of 8 to 1.

One of the features of the present invention is that coating compositions having properties comparable to those of carnauba wax coating compositions can be produced which are essentially colorless. Natural carnauba wax has a brownish color and even highly refined carnauba wax has a yellow tinge. Consequently, compositions made with natural carnauba wax have a brownish to yellowish hue which, in some cases, is not desirable. The coating compositions of this invention have desirable light color properties because the polymers of this invention are colorless. In order to preserve the color properties of the polymers of this invention, it is preferred that the volatile carriers have no impurities which might impart color.

It is understood that various additions and modifications may be made to the coating compositions within the scope of the invention. For example, oxidation inhibitors may be added to retard degradation or undesired discoloration of the coating compositions. Additionally, such additives as antislip agents, abrasives and perfumes may be added to those coating compositions destined, for example, for use as floor polishes. Cellulosic thickeners, such as carboxymethyl cellulose may be added if desired, as well as antifoam agents. A pigmented coating composition may be desired and thus pigments could be added. In other words, the addition of various thickeners, preservatives and modifiers as practiced by those having skill in the coating composition art is contemplated, and such modifications are meant to fall within the scope of this invention.

Resort may be had to such variations and modifications as fall within the spirit of the invention and the scope of the appended claims.

We claim:

1. A polish composition consisting essentially of a macroscopically substantially homogeneous blend of a linear alpha-olefin polymer having a weight average molecular weight of between about 1,000,000 and 6,000,000, substantially each alternate carbon atom in the linear polymer chain having dependent therefrom an alkyl radical having between 14 and 48 carbon atoms, and an inert volatile carrier which boils at a temperature between about 80° and about 500° F. at atmospheric pressure.

2. A composition according to claim 1, wherein said dependent alkyl radical on said linear alpha-olefin polymer has between 20 and 28 carbon atoms.

3. A composition according to claim 2, wherein said inert volatile carrier comprises an inert volatile organic material.

4. A polish composition consisting essentially of a macroscopically substantially homogeneous blend of a linear polymer of tetracosene having a weight average molecular weight of between 1,000,000 and 6,000,000, substantially each alternate carbon atom in the linear polymer chain having dependent therefrom an alkyl radical having 22 carbon atoms, and an inert volatile carrier which boils at a temperature between about 80° and about 500° F. at atmospheric pressure.

5. A polish composition consisting essentially of a macroscopically substantially homogeneous blend of a linear alpha-olefin polymer having a weight average molecular weight of at least 100,000, substantially each alternate carbon atom in the linear polymer chain having dependent therefrom an alkyl radical having between 14 and 48 carbon atoms, a natural wax, and an inert volatile carrier which boils at a temperature between about 80° and about 500° F. at atmospheric pressure.

6. A composition according to claim 5, wherein said inert volatile carrier comprises an inert volatile organic material.

7. A composition according to claim 5, wherein said natural wax is a petroleum wax.

8. A composition according to claim 11, wherein said surfactant comprises an ethanolamine.

9. A polish composition consisting essentially of an emulsion of a linear alpha-olefin polymer having a weight average molecular weight of at least 100,000, substantially each alternate carbon atom in the linear polymer chain having dependent therefrom an alkyl radical having between 14 and 48 carbon atoms, a surfactant, and an inert volatile carrier which boils at a temperature between about 80° and about 500° F., at atmospheric pressure, comprising water.

10. A polish composition consisting essentially of an emulsion of a linear alpha-olefin polymer having a weight average molecular weight of between about 1,000,000 and 6,000,000, substantially each alternate carbon atom in the linear polymer chain having dependent therefrom an alkyl radical having between 20 and 28 carbon atoms, a surfactant, and an inert volatile carrier which boils at a temperature between about 80° and about 500° F., at atmospheric pressure, comprising water.

11. A polish composition consisting essentially of an emulsion of a linear alpha-olefin polymer having a weight average molecular weight of at least 100,000, substantially each alternate carbon atom in the linear polymer chain having dependent therefrom an alkyl radical having between 14 and 48 carbon atoms, a natural wax, a surfactant, and an inert volatile carrier which boils at a temperature between about 80° and about 500° F., at atmospheric pressure, comprising water.

References Cited by the Examiner

UNITED STATES PATENTS

| | | | |
|---|---|---|---|
| 2,567,108 | 9/1951 | Hochberg | 260—29.60 |
| 2,895,915 | 7/1959 | Hewett et al. | 252—59 |
| 3,051,690 | 8/1962 | Vandenberg | 260—93.7 |
| 3,061,882 | 11/1962 | Wolinski | 260—28.5 |

MORRIS LIEBMAN, *Primary Examiner.*

D. C. KOLASCH, B. A. AMERNICK,
*Assistant Examiners.*